(12) United States Patent
Ogane

(10) Patent No.: US 10,137,600 B2
(45) Date of Patent: Nov. 27, 2018

(54) TWIN-SCREW EXTRUDING KNEADER AND METHOD FOR PRODUCING ELECTRODE MIXTURE USING THE SAME

(71) Applicant: TOYOTA JIDOSHA KABUSHIKI KAISHA, Toyota-shi, Aichi (JP)

(72) Inventor: Shingo Ogane, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 459 days.

(21) Appl. No.: 14/778,171

(22) PCT Filed: Mar. 21, 2013

(86) PCT No.: PCT/JP2013/058095
§ 371 (c)(1),
(2) Date: Sep. 18, 2015

(87) PCT Pub. No.: WO2014/147791
PCT Pub. Date: Sep. 25, 2014

(65) Prior Publication Data
US 2016/0052171 A1  Feb. 25, 2016

(51) Int. Cl.
*B29B 7/00* (2006.01)
*B29B 7/46* (2006.01)
(Continued)

(52) U.S. Cl.
CPC .......... *B29B 7/46* (2013.01); *B01F 7/083* (2013.01); *B01F 7/085* (2013.01); *B29B 7/482* (2013.01);
(Continued)

(58) Field of Classification Search
CPC .......... B01J 19/0093; B01F 5/0646; B01F 15/00019
See application file for complete search history.

(56) References Cited

U.S. PATENT DOCUMENTS

| 5,186,539 A * | 2/1993 | Manser .......... A21C 1/003 366/85 |
| 2008/0284052 A1* | 11/2008 | Feger .......... B22F 3/20 264/101 |

FOREIGN PATENT DOCUMENTS

| CN | 1652373 A | 8/2005 |
| JP | 07-136480 A | 5/1995 |

(Continued)

OTHER PUBLICATIONS

International Search Report of PCT/JP2013/058095 dated Jun. 18, 2013 [PCT/ISA/210].

*Primary Examiner* — Anshu Bhatia
(74) *Attorney, Agent, or Firm* — Sughrue Mion, PLLC

(57) ABSTRACT

Provided is a technology capable of producing a paste with desired viscosity. A twin-screw extruding kneader includes: a housing; two rotational shafts arranged inside the housing; and paddles arranged around each rotational shaft. A paddle length L1 and a clearance C1, and a paddle length L2 and a clearance C2 are set to satisfy a conditional expression shown in the following Math. 1, the paddle length L1 being the sum of thicknesses of all the paddles arranged around the rotational shaft in a stiffly kneading zone, the clearance C1 being the smallest gap width between the paddle arranged in the stiffly kneading zone and the housing, the paddle length L2 being the sum of thicknesses of all the paddles arranged around the rotational shaft in a diluting zone, the clearance C2 being the smallest gap width between the paddle arranged in the diluting zone and the housing.

$$(L1/C1)/(L2/C2) \geq 1.4 \qquad \text{[Math. 1]}$$

L1: Paddle length in stiffly kneading zone  C1: Clearance in stiffly kneading zone
L2: Paddle length in diluting zone  C2: Clearance in diluting zone

4 Claims, 4 Drawing Sheets

(51) Int. Cl.
   *B01F 7/08*    (2006.01)
   *H01M 4/04*    (2006.01)
   *B29B 7/48*    (2006.01)
   *B29C 47/60*   (2006.01)
   *H01M 4/139*   (2010.01)
   *B29C 47/00*   (2006.01)
   *B29C 47/40*   (2006.01)

(52) U.S. Cl.
   CPC .......... *B29B 7/489* (2013.01); *B29C 47/6056* (2013.01); *H01M 4/04* (2013.01); *B29C 47/0009* (2013.01); *B29C 47/402* (2013.01); *B29C 47/6037* (2013.01); *H01M 4/0411* (2013.01); *H01M 4/139* (2013.01)

(56) References Cited

FOREIGN PATENT DOCUMENTS

| | | |
|---|---|---|
| JP | 2005-222772 A | 8/2005 |
| JP | 2011-083703 A | 4/2011 |
| JP | 2011-224435 A | 11/2011 |
| JP | 2011-235258 A | 11/2011 |
| JP | 2012-236159 A | 12/2012 |

* cited by examiner

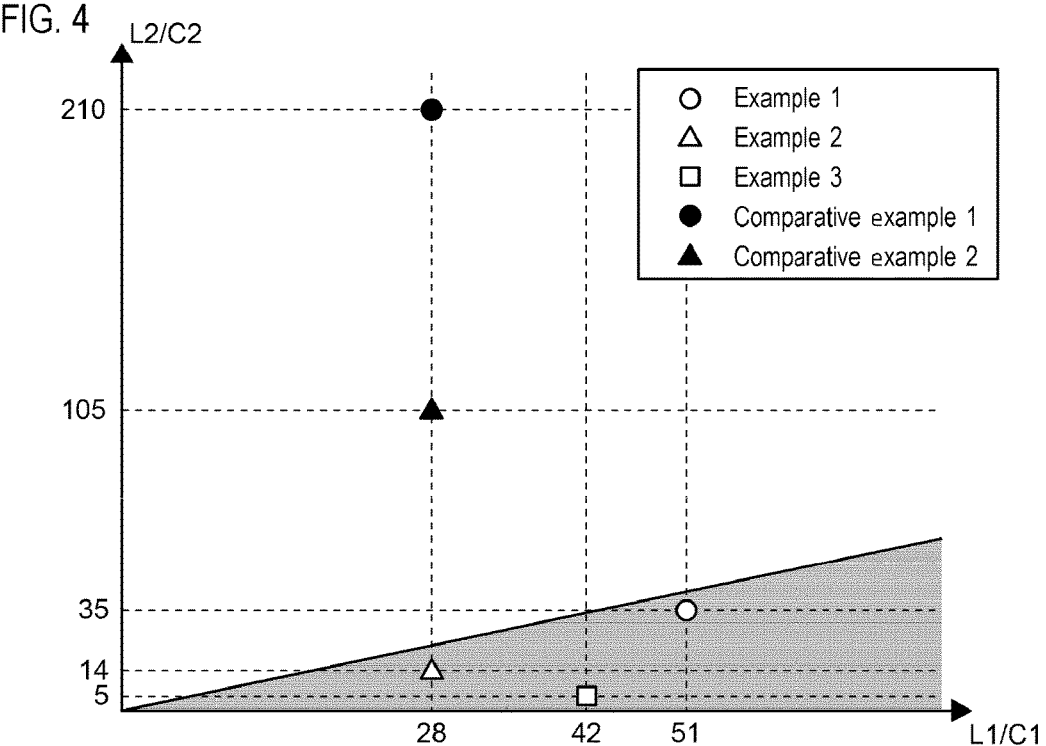

TWIN-SCREW EXTRUDING KNEADER AND METHOD FOR PRODUCING ELECTRODE MIXTURE USING THE SAME

CROSS REFERENCE TO RELATED APPLICATIONS

This application is a National Stage of International Application No. PCT/JP2013/058095, filed Mar. 21, 2013, the contents of which are incorporated herein by reference in its entirety.

TECHNICAL FIELD

The present invention relates to a twin-screw extruding kneader and a method for producing an electrode mixture using the kneader.

BACKGROUND ART

Conventionally, a twin-screw extruding kneader is widely known as a device for producing a paste-like electrode mixture used for a battery such as a lithium-ion secondary battery.

JP-A 2005-222772 discloses a twin-screw extruding kneader having a kneading part for kneading a paste with a solid content higher than a final solid content, and a diluting part for adjusting the solid content of the paste kneaded in the kneading part to the final solid content.

The twin-screw extruding kneader disclosed in JP-A 2005-222772 can apply high shearing force to the paste in the kneading part to suitably reduce viscosity thereof, thus enabling to adjust the viscosity of the finally produced paste (electrode mixture) to a value suitable for the application of the paste to a current collector.

However, in the twin-screw extruding kneader disclosed in JP-A 2005-222772, a solvent is added to the paste to knead the paste in the diluting part as in the kneading part in order to adjust the solid content of the paste to the final solid content. As a result, in the diluting part only for adjusting the solid content, the viscosity of the paste may vary, which makes it difficult to adjust the viscosity of the finally produced paste (electrode mixture) to a desired value.

CITATION LIST

Patent Literature

PTL1: JP-A 2005-222772

SUMMARY OF INVENTION

Technical Problem

The object of the present invention is to provide a technology capable of producing a paste with desired viscosity.

Solution to Problem

A first aspect of the invention is a twin-screw extruding kneader which conveys and kneads predetermined materials to produce a paste, including: a hollow housing; two rotational shafts arranged parallel to each other at a predetermined interval inside the housing; and a plurality of paddles arranged around each of the rotational shafts, which knead the materials supplied to the inside of the housing. A stiffly kneading zone for kneading the materials with a solid content higher than a final solid content, and a diluting zone for diluting the materials having passed through the stiffly kneading zone to adjust the solid content of the materials to the final solid content are provided inside the housing. A paddle length L1 and a clearance C1, and a paddle length L2 and a clearance C2 are set to satisfy a conditional expression shown in the following Math. 1, the paddle length L1 being the sum of thicknesses of all the paddles arranged in the stiffly kneading zone, out of the plurality of paddles arranged around the rotational shaft, the clearance C1 being the smallest gap width between an outer circumferential surface of the paddle arranged in the stiffly kneading zone and an inner circumferential surface of the housing, the paddle length L2 being the sum of thicknesses of all the paddles arranged in the diluting zone, out of the plurality of paddles arranged around the rotational shaft, the clearance C2 being the smallest gap width between the outer circumferential surface of the paddle arranged in the diluting zone and the inner circumferential surface of the housing.

$$(L1/C1)/(L2/C2) \geq 1.4 \qquad [\text{Math. 1}]$$

L1: Paddle length in stiffly kneading zone C1: Clearance in stiffly kneading zone L2: Paddle length in diluting zone C2: Clearance in diluting zone Preferably, the twin-screw extruding kneader further includes: a resistance paddle arranged around each of the rotational shafts, which adjoins the paddle on a downstream side relative to the paddle in a conveying direction of the materials. The resistance paddle includes a large part formed in a circular plate, which has such an external diameter that a minute gap is formed between an outer circumferential surface of the large part and the inner circumferential surface of the housing, and a small part formed in a circular plate, which has an external diameter smaller than that of the large part. The resistance paddle arranged around one of the rotational shafts, and the resistance paddle arranged around an opposite one of the rotational shafts face in opposite directions to coincide in position in the conveying direction of the materials so that a minute gap is formed between the outer circumferential surface of the large part of the resistance paddle arranged around one of the rotational shafts and an outer circumferential surface of the small part of the resistance paddle arranged around the opposite one of the rotational shafts, and that a minute gap is formed between the outer circumferential surface of the small part of the resistance paddle arranged around one of the rotational shafts and the outer circumferential surface of the large part of the resistance paddle arranged around the opposite one of the rotational shafts.

A second aspect of the invention is a method for producing an electrode mixture, including: a step for producing the electrode mixture as the paste, using the twin-screw extruding kneader.

Advantageous Effects of Invention

The present invention makes it possible to produce a paste with desired viscosity.

BRIEF DESCRIPTION OF DRAWINGS

FIG. 4 shows a region satisfying a conditional expression in the present invention.

DESCRIPTION OF EMBODIMENTS

A producing step Si as an embodiment of a method for producing an electrode mixture according to the present invention, and a kneader 1 as an embodiment of a twin-screw extruding kneader according to the present invention are described below with reference to drawings.

The producing step Si is a step for producing an electrode mixture by kneading an active material and the like together with a solvent, using the kneader 1.

The electrode mixture is a paste containing the active material, and is used to produce a battery such as a lithium-ion secondary battery.

In the present embodiment, the electrode mixture is a negative-electrode mixture. However, in accordance with the present invention, a positive-electrode mixture can be produced.

The kneader 1 conveys and kneads predetermined materials thereinside to produce the electrode mixture.

Note that the black-painted arrow indicates a direction in which the kneader 1 conveys the materials such as the active material, the direction referred to as a "conveying direction".

Moreover, the upstream side in the conveying direction (the left side in FIG. 1) is simply referred to as an "upstream side", and the downstream side in the conveying direction (the right side in FIG. 1) is simply referred to as a "downstream side".

Figure 1:
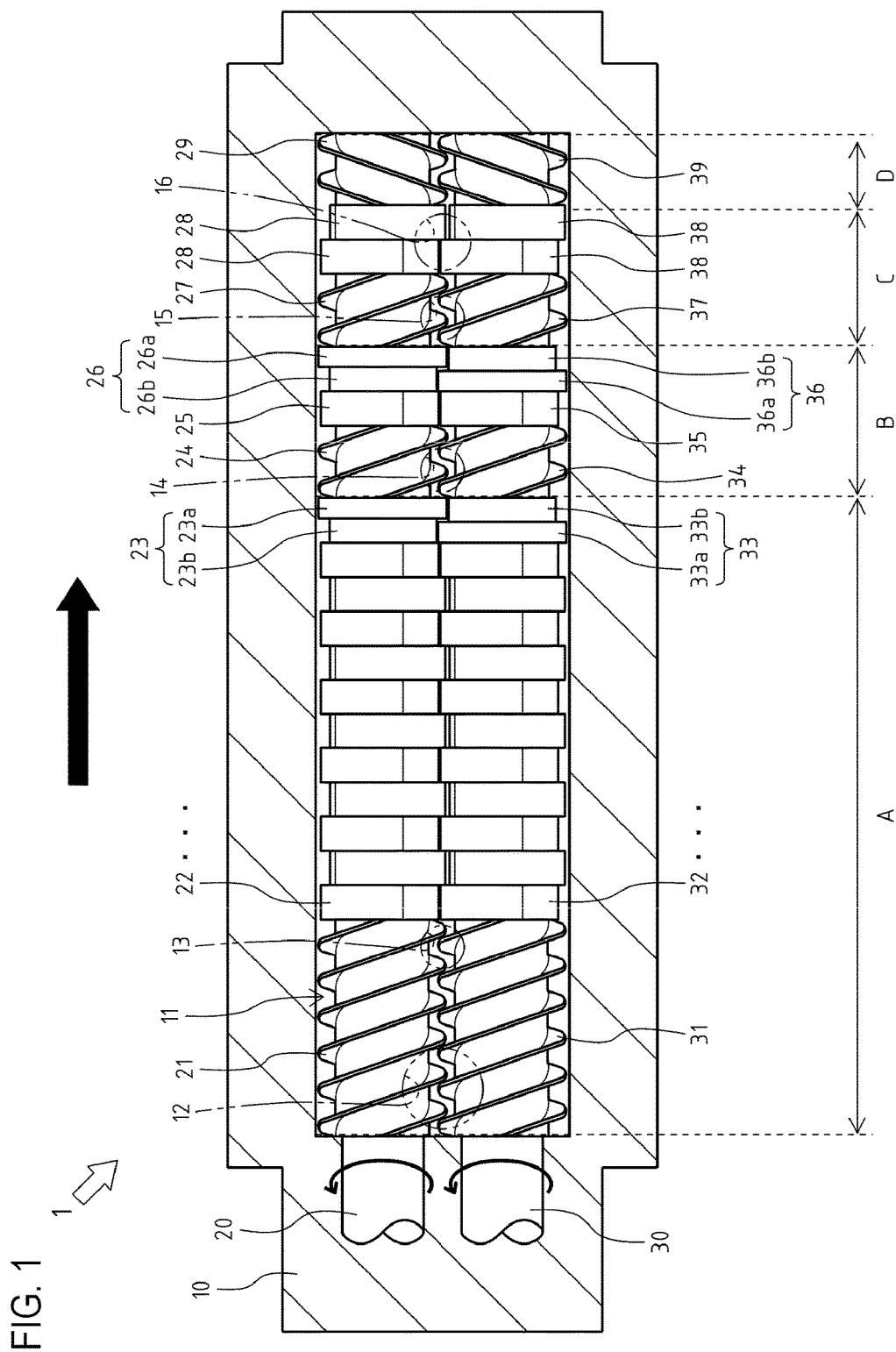
FIG. 1 shows a twin-screw extruding kneader according to an embodiment of the present invention.

As shown in FIG. 1, the kneader 1 includes a housing 10 and two rotational shafts 20 and 30.

The housing 10 is a hollow member formed as an exterior of the kneader 1. Inside the housing 10, a kneading chamber 11 is formed.

Figure 2:
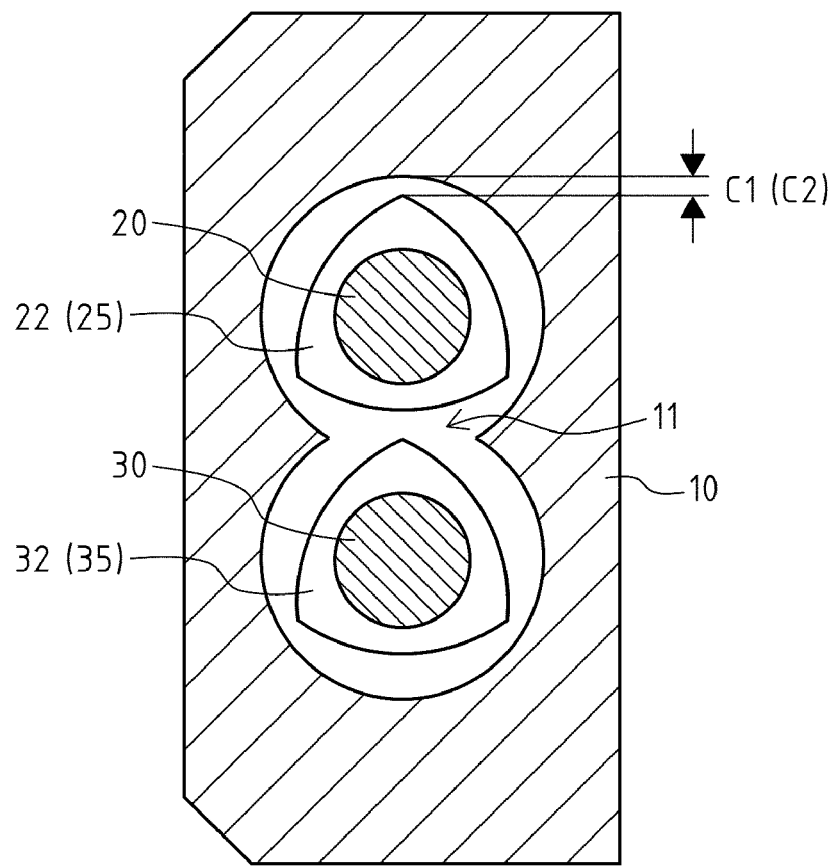
FIG. 2 shows paddles of a stiffly kneading zone or a diluting zone.

As shown in FIG. 2, the kneading chamber 11 is a space formed inside the housing 10. The kneading chamber 11 has a shape of two perfect circles partly overlapping with each other, seen in the conveying direction. In one circular part (the upper part in FIG. 2) of the kneading chamber 11, the rotational shaft 20 is arranged so that the axis of the rotational shaft 20 coincides with the center of the curvature of the circular part. In the other circular part (the lower part in FIG. 2) of the kneading chamber 11, the rotational shaft 30 is arranged so that the axis of the rotational shaft 30 coincides with the center of the curvature of the other circular part.

As shown in FIG. 1, the rotational shafts 20 and 30 extend in the conveying direction. The rotational shafts 20 and 30 extend from one end to the other end of the kneading chamber 11 in the conveying direction, and are arranged in parallel at a predetermined interval. The rotational shafts 20 and 30 are rotationally driven in respective directions (directions of the arrows shown at the left end parts of the rotational shafts 20 and 30 in FIG. 1) by a driving unit (not shown).

A screw 21, a plurality of paddles 22, a resistance paddle 23, a screw 24, a paddle 25, a resistance paddle 26, a screw 27, two paddles 28 and a reverse screw 29 are provided around the rotational shaft 20 from the upstream side to the downstream side in this order.

A screw 31, a plurality of paddles 32, a resistance paddle 33, a screw 34, a paddle 35, a resistance paddle 36, a screw 37, two paddles 38 and a reverse screw 39 are provided around the rotational shaft 30 from the upstream side to the downstream side in this order.

The above-mentioned plurality of members provided around the rotational shafts 20 and 30 constitute a stiffly kneading zone A, a diluting zone B, a final-kneading zone C and a reverse-conveying zone D in the kneading chamber 11.

The stiffly kneading zone A is provided for kneading a stiffly kneaded paste with a solid content higher than that of the electrode mixture to be finally produced. The stiffly kneading zone A is arranged at the end part of the kneading chamber 11 on the upstream side.

In the stiffly kneading zone A, the screw 21, the plurality of paddles 22 and the resistance paddle 23, and the screw 31, the plurality of paddles 32 and the resistance paddle 33 are arranged.

The screw 21 is a member for conveying the materials (the active material and the like) for the electrode mixture to the downstream side. The screw 21 has a spiral blade formed in the axial direction thereof. The screw 21 is concentrically fixed to the rotational shaft 20 so as to cover the outer circumferential surface of the rotational shaft 20.

The screw 31 is formed similarly to the screw 21. The screw 31 is concentrically fixed to the rotational shaft 30 so as to cover the outer circumferential surface of the rotational shaft 30.

The screws 21 and 31 coincide in position in the conveying direction, and are arranged to come out of contact with each other in rotating.

The paddle 22 is a member for kneading the materials for the electrode mixture. Eleven paddles 22 are continuously arranged around the rotational shaft 20 so that adjacent paddles 22 are at different rotational positions.

The paddle 32 is formed similarly to the paddle 22. Eleven paddles 32 are continuously arranged around the rotational shaft 30 so that adjacent paddles 32 are at different rotational positions.

The plurality of paddles 22 and the plurality of paddles 32 coincide in position in the conveying direction, and are arranged to come out of contact with each other in rotating.

Figure 3:
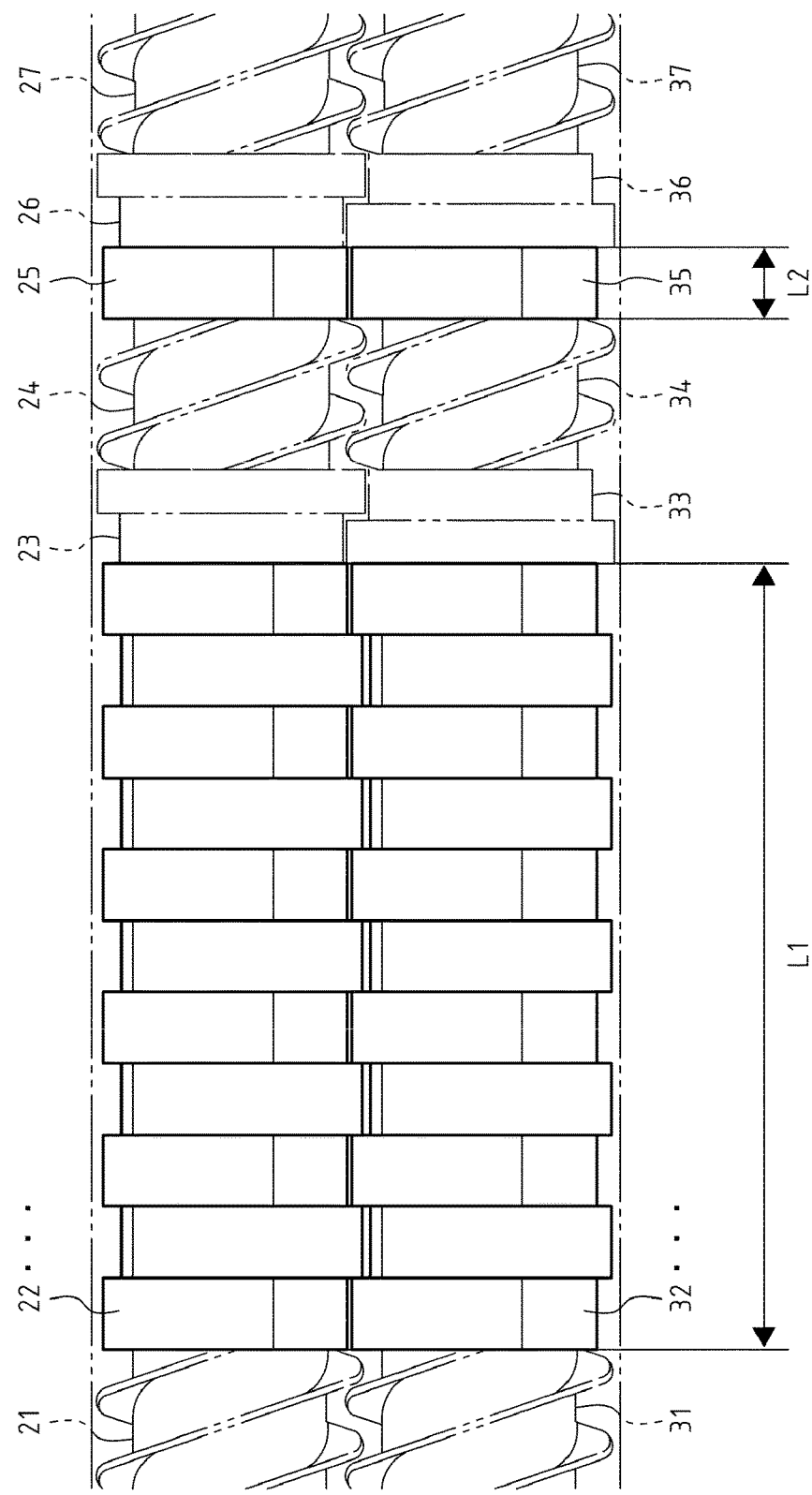
FIG. 3 shows the paddles and a housing, seen in a conveying direction.

As shown in FIG. 3, the sum of the thicknesses (the horizontal lengths in FIG. 3) of all the paddles 22 in the stiffly kneading zone A, and the sum of the thicknesses of all the paddles 32 in the stiffly kneading zone A are each defined as a paddle length L1. In other words, the following equation is true: the paddle length L1=the thickness of the paddle 22×the number of the paddles 22=the thickness of the paddle 32×the number of the paddles 32.

In the present embodiment, the thicknesses of the paddles 22 and 32 are each 35 mm, and consequently the paddle length L1 is 385 mm.

As shown in FIG. 2, each of the paddles 22 and 32 is formed in substantially a triangle, seen in the conveying direction. The paddles 22 and 32 are concentrically fixed to the rotational shafts 20 and 30, respectively.

The smallest gap width between the outer circumferential surface of the paddle 22 and the inner circumferential surface (the surface forms the kneading chamber 11) of the housing 10, and the smallest gap width between the outer circumferential surface of the paddle 32 and the inner circumferential surface of the housing 10 are each defined as a clearance C1. Specifically, the shortest distance between the radially outermost portion of the paddle 22 and the inner circumferential surface of the housing 10, and the shortest distance between the radially outermost portion of the paddle 32 and the inner circumferential surface of the housing 10 are each defined as the clearance C1.

In the present embodiment, each of the paddles 22 and 32 is formed so that the clearance C1 is 7.5 mm.

Note that each of the paddles 24 and 34 is formed in substantially a triangle in the present embodiment, but the shapes thereof are not limited thereto as long as the paddles 24 and 34 can knead the materials for the electrode mixture.

As shown in FIG. 1, the resistance paddle 23 is a member formed in substantially a circular plate, which restricts the movement of the materials for the electrode mixture to the downstream side. The resistance paddle 23 is concentrically fixed to the rotational shaft 20. The resistance paddle 23 adjoins the paddle 22, situated on the most downstream side, out of the plurality of paddles 22. The resistance paddle 23 includes a large part 23a and a small part 23b.

The large part 23a is formed in a circular plate, and has such an external diameter that a minute gap is formed between the large part 23a and the inner circumferential surface (the surface forms the kneading chamber 11) of the housing 10. For example, the shortest distance between the outer circumferential surface of the large part 23a and the inner circumferential surface of the housing 10 is 0.5 mm.

The small part 23b is formed in a circular plate, and has an external diameter smaller than that of the large part 23a. The small part 23b is formed concentrically and integrally with the large part 23a on the upstream side relative to the large part 23a.

The resistance paddle 33 is formed similarly to the resistance paddle 23. The resistance paddle 33 is concentrically fixed to the rotational shaft 30. The resistance paddle 33 adjoins the paddle 32, situated on the most downstream side, out of the plurality of paddles 32. The resistance paddle 33 includes a large part 33a and a small part 33b.

The large part 33a is formed in a circular plate, and has such an external diameter that a minute gap is formed between the large part 33a and the inner circumferential surface (the surface forms the kneading chamber 11) of the housing 10. For example, the shortest distance between the outer circumferential surface of the large part 33a and the inner circumferential surface of the housing 10 is 0.5 mm. The large part 33a is arranged to coincide in position with the small part 23b of the resistance paddle 23, and is arranged so that a minute gap is formed between the large part 33a and the small part 23b.

The small part 33b is formed in a circular plate, and has an external diameter smaller than that of the large part 33a. The small part 33b is formed concentrically and integrally with the large part 33a on the downstream side relative to the large part 33a. The small part 33b is arranged to coincide in position in the conveying direction with the large part 23a of the resistance paddle 23, and is arranged so that a minute gap is formed between the small part 33b and the large part 23a.

As mentioned above, the resistance paddles 23 and 33 have similar shapes. The resistance paddles 23 and 33 are arranged to face opposite sides in the conveying direction so that the large part 23a of the resistance paddle 23 adjoins the small part 33b of the resistance paddle 33 and the small part 23b of the resistance paddle 23 adjoins the large part 33a of the resistance paddle 33.

First, in the stiffly kneading zone A, the screws 21 and 31 rotate on the axes thereof, thereby conveying the active material and a thickener supplied through a first supply port 12, and the solvent supplied through a second supply port 13 to the downstream side.

The first supply port 12 is an opening formed in the housing 10, through which the active material and the thickener are supplied to the stiffly kneading zone A. The first supply port 12 is formed so that the active material and the thickener may be supplied to the end parts of the screws 21 and 31 on the upstream side.

The second supply port 13 is an opening formed in the housing 10, through which the solvent is supplied to the stiffly kneading zone A. The second supply port 13 is formed so that the solvent may be supplied to the end parts of the screws 21 and 31 on the downstream side.

Next, in the stiffly kneading zone A, the plurality of paddles 22 and the plurality of paddles 32 rotate on the axes thereof, thereby kneading the active material, the thickener and the solvent. The plurality of paddles 22 and the plurality of paddles 32 knead the active material, the thickener and the solvent to prepare the stiffly kneaded paste with a solid content higher than a final solid content (a solid content of the electrode mixture to be finally produced). The plurality of paddles 22 and the plurality of paddles 32 knead the stiffly kneaded paste to reduce the viscosity thereof.

In this manner, the plurality of paddles 22 and the plurality of paddles 32 knead the stiffly kneaded paste with a relatively high solid content. As a result, high shearing force is applied to the stiffly kneaded paste, which makes it possible to reduce the viscosity thereof suitably.

Finally, in the stiffly kneading zone A, the resistance paddles 23 and 33 restrict the movement of the stiffly kneaded paste to the downstream side over the resistance paddles 23 and 33. Specifically, minute gaps are formed between the large part 23a of the resistance paddle 23 and the inner circumferential surface (the surface forms the kneading chamber 11) of the housing 10, between the large part 33a of the resistance paddle 33 and the inner circumferential surface of the housing 10, and between the resistance paddle 23 and the resistance paddle 33, and therefore the stiffly kneaded paste moves to the downstream side over the resistance paddles 23 and 33 little by little.

As a result, a certain amount of the stiffly kneaded paste piles up on the upstream side relative to the resistance paddles 23 and 33. Therefore, the plurality of paddles 22 and the plurality of paddles 32 can efficiently apply shearing force to the stiffly kneaded paste.

This makes it possible to efficiently reduce the viscosity of the stiffly kneaded paste.

The diluting zone B is provided for diluting the stiffly kneaded paste prepared in the stiffly kneading zone A. The diluting zone B is continuous with the stiffly kneading zone A on the downstream side relative to the stiffly kneading zone A.

In the diluting zone B, the screw 24, the paddle 25 and the resistance paddle 26, and the screw 34, the paddle 35 and the resistance paddle 36 are arranged.

The screws 24 and 34 are formed similarly to the screws 21 and 31 respectively except that the screws 24 and 34 are shorter in the conveying direction than the screws 21 and 31.

The paddles 25 and 35 are substantially similar in structure to the paddles 22 and 32, respectively.

As shown in FIG. 3, the sum of the thicknesses (the horizontal lengths in FIG. 3) of all the paddles 25 in the diluting zone B, and the sum of the thicknesses of all the paddles 35 in the diluting zone B are each defined as a paddle length L2. In other words, the following equation is true: the paddle length L2=the thickness of the paddle 25 ×the number of the paddles 25=the thickness of the paddle 35×the number of the paddles 35.

In the present embodiment, the thicknesses of the paddles 25 and 35 are each 35 mm, and consequently the paddle length L2 is 35 mm.

As shown in FIG. 2, the smallest gap width between the outer circumferential surface of the paddle 25 and the inner circumferential surface (the surface forms the kneading chamber 11) of the housing 10, and the smallest gap width between the outer circumferential surface of the paddle 35 and the inner circumferential surface of the housing 10 are each defined as a clearance C2. Specifically, the shortest distance between the radially outermost portion of the paddle 25 and the inner circumferential surface of the housing 10, and the shortest distance between the radially outermost portion of the paddle 35 and the inner circumferential surface of the housing 10 are each defined as the clearance C2.

In the present embodiment, each of the paddles 25 and 35 is formed so that the clearance C2 is 1 mm.

As shown in FIG. 1, the resistance paddle 26 is formed similarly to the resistance paddle 23. The resistance paddle 26 adjoins the paddle 25 on the downstream side relative to the paddle 25. The resistance paddle 26 includes a large part 26a formed similarly to the large part 23a of the resistance paddle 23 and a small part 26b formed similarly to the small part 23b of the resistance paddle 23.

The resistance paddle 36 is formed similarly to the resistance paddle 33. The resistance paddle 36 adjoins the paddle 35 on the downstream side relative to the paddle 35. The resistance paddle 36 includes a large part 36a formed similarly to the large part 33a of the resistance paddle 33 and a small part 36b formed similarly to the small part 33b of the resistance paddle 33.

First, in the diluting zone B, the screws 24 and 34 rotate on the axes thereof, thereby conveying the stiffly kneaded paste prepared in the stiffly kneading zone A, and the solvent supplied through a third supply port 14 to the downstream side.

The third supply port 14 is an opening formed in the housing 10, through which the solvent is supplied to the diluting zone B. The third supply port 14 is formed so that the solvent may be supplied to the end parts of the screws 24 and 34 on the upstream side.

The solvent is supplied through the third supply port 14 in order to dilute the stiffly kneaded paste. In the kneader 1, the solvent is supplied to the stiffly kneading zone A through the second supply port 13, and the solvent is supplied to the diluting zone B through the third supply port 14. In other words, in the kneader 1, the solvent is supplied to the kneading chamber 11 in two parts. After prepared in the stiffly kneading zone A, the stiffly kneaded paste is diluted in the diluting zone B.

Next, in the diluting zone B, the paddles 25 and 35 rotate on the axes thereof, thereby kneading the stiffly kneaded paste and the solvent. The paddles 25 and 35 knead the stiffly kneaded paste and the solvent to dilute the stiffly kneaded paste, thereby preparing a diluted paste with a solid content lower than that of the stiffly kneaded paste.

Finally, in the diluting zone B, the resistance paddles 26 and 36 restrict the movement of the diluted paste to the downstream side over the resistance paddles 26 and 36. Specifically, minute gaps are formed between the large part 26a of the resistance paddle 26 and the inner circumferential surface (the surface forms the kneading chamber 11) of the housing 10, between the large part 36a of the resistance paddle 36 and the inner circumferential surface of the housing 10, and between the resistance paddle 26 and the resistance paddle 36, and therefore the diluted paste moves to the downstream side over the resistance paddles 26 and 36 little by little.

As a result, a certain amount of the diluted paste piles up on the upstream side relative to the resistance paddles 26 and 36. Therefore, the paddles 25 and 35 can efficiently knead the diluted paste.

This makes it possible to efficiently reduce the solid content of the diluted paste.

The final-kneading zone C is provided for producing the electrode mixture from the diluted paste prepared in the diluting zone B. The final-kneading zone C is continuous with the diluting zone B on the downstream side relative to the diluting zone B.

In the final-kneading zone C, the screw 27 and the two paddles 28, and the screw 37 and the two paddles 38 are arranged.

The screws 27 and 37 are formed similarly to the screws 24 and 34, respectively.

The paddles 28 and 38 are substantially similar in structure to the paddles 25 and 35, respectively.

First, in the final-kneading zone C, the screws 27 and 37 rotate on the axes thereof, thereby conveying the diluted paste prepared in the diluting zone B, and a binder supplied through a fourth supply port 15 to the downstream side.

The fourth supply port 15 is an opening formed in the housing 10, through which the binder is supplied to the final-kneading zone C. The fourth supply port 15 is formed so that the binder may be supplied to the end parts of the screws 27 and 37 on the upstream side.

Then, in the final-kneading zone C, the paddles 28 and 38 rotate on the axes thereof, thereby kneading the diluted paste and the binder. The paddles 28 and 38 knead the diluted paste and the binder to produce the electrode mixture.

The reverse-conveying zone D is provided for discharging the electrode mixture produced in the final-kneading zone C from the kneading chamber 11 to the outside of the housing 10. The reverse-conveying zone D is continuous with the final-kneading zone C on the downstream side relative to the final-kneading zone C. In other words, the reverse-conveying zone D is arranged at the end part of the kneading chamber 11 on the downstream side.

In the reverse-conveying zone D, the reverse screws 29 and 39 are arranged.

The reverse screws 29 and 39 are formed similarly to the screws 27 and 37 respectively except that the spiral blades of the reverse screws 29 and 39 are opposite to those of the screws 27 and 37.

In the reverse-conveying zone D, the reverse screws 29 and 39 rotate on the axes thereof, thereby applying force to the electrode mixture produced in the final-kneading zone C in a direction opposite to the conveying direction (in a direction toward the upstream side).

As a result, the electrode mixture is disposed to the outside of the housing 10 through a discharge port 16.

The discharge port 16 is an opening formed in the housing 10, through which the electrode mixture is discharged from the kneading chamber 11 to the outside of the housing 10. The discharge port 16 is formed to face the paddles 28 and the paddles 38.

As mentioned above, in the producing step S1, the materials such as the active material are made, by the kneader 1, to pass through the stiffly kneading zone A, the diluting zone B, the final-kneading zone C and the reverse-conveying zone D in this order, and thereby the electrode mixture is produced.

The paddles arranged in the stiffly kneading zone A and the diluting zone B of the kneader 1 are described below.

The paddles 22 and 32 arranged in the stiffly kneading zone A, and the paddles 25 and 35 arranged in the diluting zone B are formed and arranged so that the paddle length L1 and the clearance C1, and the paddle length L2 and the clearance C2 satisfy the conditional expression shown in the following Math. 1.

$$(L1/C1)/(L2/C2) \geq 1.4 \quad \text{[Math. 1]}$$

L1: Paddle length in stiffly kneading zone C1: Clearance in stiffly kneading zone
L2: Paddle length in diluting zone C2: Clearance in diluting zone As mentioned previously, in the present embodiment, the paddle length L1 in the stiffly kneading zone A is 385 mm, and the clearance C1 in the stiffly kneading zone A is 7.5 mm. In addition, the paddle length L2 in the diluting zone B is 35 mm, and the clearance C2 in the diluting zone B is 1 mm.

Therefore, in the present embodiment, the conditional expression shown in Math. 1 is satisfied as follows: (L1/C1)/(L2/C2)=1.46.

In order to satisfy the conditional expression shown in Math. 1, at least one of the following operations is performed: increasing a time to knead the paste in the stiffly kneading zone A, increasing shearing force applied to the paste in the stiffly kneading zone A, reducing a time to knead the paste in the diluting zone B, and reducing shearing force applied to the paste in the diluting zone B.

Specifically, increasing the number of the paddles 22 and 32 in the stiffly kneading zone A (increasing the paddle length L1), increasing the external diameters of the paddles 22 and 32 in the stiffly kneading zone A (reducing the clearance C1), reducing the number of the paddles 25 and 35 in the diluting zone B (reducing the paddle length L2), reducing the external diameters of the paddles 25 and 35 in the diluting zone B (increasing the clearance C2), or a combination thereof is performed.

In the stiffly kneading zone A, when the time to knead the paste or the shearing force applied to the paste is increased, the viscosity of the paste converges down to a predetermined value. Therefore, even in the diluting zone B, the viscosity of the paste does not decrease any longer, thus enabling to minimize a variation in the viscosity of the electrode mixture to be finally produced. In other words, in the stiffly kneading zone A, the viscosity of the paste can be adjusted to a value substantially equal to the viscosity of the electrode mixture to be finally produced, and therefore the viscosity of the electrode mixture to be finally produced can be a desired value.

Moreover, in the diluting zone B, the time to knead the paste or the shearing force applied to the paste is reduced, thus enabling to minimize a decrease in the viscosity of the paste. Therefore, a difference in viscosity between the paste having passed through the stiffly kneading zone A and the paste having passed through the diluting zone B becomes extremely small, thus enabling to minimize a variation of the viscosity of the electrode mixture to be finally produced.

In this manner, the paddle length L1 and the clearance C1 in the stiffly kneading zone A, and the paddle length L2 and the clearance C2 in the diluting zone B are set to satisfy the conditional expression shown in Math. 1, thus enabling to produce the electrode mixture with a desired viscosity.

Note that each of the clearances C1 and C2 is preferably 0.5 to 15 mm.

In the present embodiment, the pair of resistance paddles are arranged at each of the end part of the stiffly kneading zone A on the downstream side and the end part of the diluting zone B on the downstream side. Specifically, in the stiffly kneading zone A, the resistance paddles 23 and 33 are arranged to adjoin the paddles 22 and 32, situated on the most downstream side, out of the plurality of paddles 22 and the plurality of paddles 32. In the diluting zone B, the resistance paddles 26 and 36 are arranged to adjoin the paddles 25 and 35 on the downstream side relative to the paddles 25 and 35.

However, the position of the resistance paddle according to the present invention is not limited as long as the resistance paddle adjoins any paddle on the downstream side relative to the paddle.

For example, the resistance paddle may suitably be arranged between a plurality of paddles continuously arranged on each rotational shaft in the stiffly kneading zone A. In this case, the thickness of the resistance paddle arranged between the plurality of paddles is not taken into consideration in calculating the paddle length L1 in the stiffly kneading zone A.

A verification result is described below as to whether or not a variation in viscosity of an electrode mixture is minimized when the electrode mixture is produced by a twin-screw extruding kneader according to the present invention.

EXAMPLE 1

A twin-screw extruding kneader was configured similarly to the kneader 1.

Specifically, eleven paddles were provided on each rotational shaft in a stiffly kneading zone, and one paddle was provided on each rotational shaft in a diluting zone. The thickness of the paddle in the stiffly kneading zone, and the thickness of the paddle in the diluting zone were each 35 mm. In other words, the paddle length L1 in the stiffly kneading zone was 385 mm, and the paddle length L2 in the diluting zone was 35 mm.

In the paddle in the stiffly kneading zone, the clearance C1 was 7.5 mm. In the paddle in the diluting zone, the clearance C2 was 1 mm.

Thus, the electrode mixture was produced by the twin-screw extruding kneader in which the following equation was satisfied: (L1/C1)/(L2/C2)=1.46.

EXAMPLE 2

Six paddles were provided on each rotational shaft in the stiffly kneading zone, and three paddles were provided on each rotational shaft in the diluting zone. One resistance paddle was provided on each rotational shaft in the stiffly kneading zone so as to divide the six paddles into two halves. In other words, on each rotational shaft in the stiffly kneading zone, three paddles, the resistance paddle and three paddles were provided in this order from the upstream side.

The thickness of the paddle in the stiffly kneading zone, and the thickness of the paddle in the diluting zone were each 35 mm. In other words, the paddle length L1 in the stiffly kneading zone was 210 mm, and the paddle length L2 in the diluting zone was 105 mm.

In the paddle in the stiffly kneading zone, the clearance C1 was 7.5 mm. In the paddle in the diluting zone, the clearance C2 was 7.5 mm.

Thus, the electrode mixture was produced by the twin-screw extruding kneader in which the following equation was satisfied: (L1/C1)/(L2/C2)=2.

EXAMPLE 3

Nine paddles were provided on each rotational shaft in the stiffly kneading zone, and one paddle was provided on each rotational shaft in the diluting zone. Two resistance paddles were provided on each rotational shaft in the stiffly kneading zone so as to divide the nine paddles into three equal groups. In other words, on each rotational shaft in the stiffly kneading zone, three paddles, the resistance paddle, three paddles, the resistance paddle and three paddles were provided in this order from the upstream side.

The thickness of the paddle in the stiffly kneading zone, and the thickness of the paddle in the diluting zone were each 35 mm. In other words, the paddle length L1 in the stiffly kneading zone was 315 mm, and the paddle length L2 in the diluting zone was 35 mm.

In the paddle in the stiffly kneading zone, the clearance C1 was 7.5 mm. In the paddle in the diluting zone, the clearance C2 was 7.5 mm.

Thus, the electrode mixture was produced by the twin-screw extruding kneader in which the following equation was satisfied: (L1/C1)/(L2/C2)=8.4.

COMPARATIVE EXAMPLE 1

Six paddles were provided on each rotational shaft in the stiffly kneading zone, and six paddles were provided on each rotational shaft in the diluting zone.

The thickness of the paddle in the stiffly kneading zone, and the thickness of the paddle in the diluting zone were each 35 mm. In other words, the paddle length L1 in the stiffly kneading zone was 210 mm, and the paddle length L2 in the diluting zone was 210 mm.

In the paddle in the stiffly kneading zone, the clearance C1 was 7.5 mm. In the paddle in the diluting zone, the clearance C2 was 1 mm.

Thus, the electrode mixture was produced by the twin-screw extruding kneader in which the following equation was satisfied: (L1/C1)/(L2/C2)=0.13.

COMPARATIVE EXAMPLE 2

Six paddles were provided on each rotational shaft in the stiffly kneading zone, and three paddles were provided on each rotational shaft in the diluting zone.

The thickness of the paddle in the stiffly kneading zone, and the thickness of the paddle in the diluting zone were each 35 mm. In other words, the paddle length L1 in the stiffly kneading zone was 210 mm, and the paddle length L2 in the diluting zone was 210 mm.

In the paddle in the stiffly kneading zone, the clearance C1 was 7.5 mm. In the paddle in the diluting zone, the clearance C2 was 1 mm.

Thus, the electrode mixture was produced by the twin-screw extruding kneader in which the following equation was satisfied: (L1/C1)/(L2/C2)=0.27.

In each of the above-mentioned examples 1 to 3 and comparative examples 1 and 2, a decrease rate of the viscosity of the paste in the diluting zone was calculated, and the calculated decrease rates were shown in the following Table 1.

TABLE 1

|  | Paddle in stiffly kneading zone | | Paddle in diluting zone | | (L1/C1)/(L2/C2) | Decrease rate of viscosity in diluting zone |
|---|---|---|---|---|---|---|
|  | Number | Clearance | Number | Clearance | | |
| Example 1 | 11 | 7.5 mm | 1 | 1 mm | 1.46 | 10% or less |
| Example 2 | 6 | 7.5 mm | 3 | 7.5 mm | 2.00 | 10% or less |
| Example 3 | 9 | 7.5 mm | 1 | 7.5 mm | 8.40 | 10% or less |
| Comparative example 1 | 6 | 7.5 mm | 6 | 1 mm | 0.13 | 50% or more |
| Comparative example 2 | 6 | 7.5 mm | 3 | 1 mm | 0.27 | 70% or more |

As shown in Table 1, in each of the examples 1 to 3, the decrease rate of the viscosity of the paste in the diluting zone was 10% or less.

In contrast, in the comparative example 1, the decrease rate of the viscosity of the paste in the diluting zone was 50% or more, and in the comparative example 2, the decrease rate of the viscosity of the paste in the diluting zone was 70% or more.

As shown in FIG. 4, every twin-screw extruding kneader in the examples 1 to 3 satisfied the conditional expression shown in Math. 1. It was revealed that a change in the viscosity of the paste in the diluting zone became extremely small if the twin-screw extruding kneader satisfying the conditional expression was used. In other words, it was revealed that producing the electrode mixture with the twin-screw extruding kneader satisfying the conditional expression shown in Math. 1 could minimize a variation of the viscosity of the electrode mixture.

Note that the shaded part in FIG. 4 indicates a region satisfying the conditional expression shown in Math. 1.

A twin-screw extruding kneader according to the present invention may be used to produce not only an electrode mixture but also a resin and a ceramic.

INDUSTRIAL APPLICABILITY

The present invention is applicable to a twin-screw extruding kneader and a method for producing an electrode mixture using the kneader.

REFERENCE SIGNS LIST

1: kneader (twin-screw extruding kneader)
10: housing
11: kneading chamber
20, 30: rotational shaft
22, 32: paddle
23, 33: resistance paddle
23a, 33a: large part
23b, 33b: small part
25, 35: paddle
26, 36: resistance paddle
26a, 36a: large part
26b, 36b: small part
A: stiffly kneading zone
B: diluting zone

What is claimed is:

1. A twin-screw extruding kneader which conveys and kneads predetermined materials to produce a paste, comprising:
   a hollow housing;
   two rotational shafts arranged parallel to each other at a predetermined interval inside the housing; and
   a plurality of paddles arranged around each of the rotational shafts, which knead the materials supplied to the inside of the housing, wherein
   a stiffly kneading zone for kneading the materials with a solid content higher than a final solid content, and a diluting zone for diluting the materials having passed through the stiffly kneading zone to adjust the solid content of the materials to the final solid content are provided inside the housing, and
   a paddle length L1, a clearance C1, a paddle length L2 and a clearance C2 are set to satisfy conditional expression (1):

$$(L1/C1)/(L2/C2) \geq 1.4 \qquad (1),$$

wherein, in the conditional expression (1):
   the paddle length L1 is a sum of thicknesses of all the paddles arranged in the stiffly kneading zone,
   out of the plurality of paddles arranged around the rotational shaft, the clearance C1 is a smallest gap width between an outer circumferential surface of the paddle arranged in the stiffly kneading zone and an inner circumferential surface of the housing,
   the paddle length L2 is a sum of thicknesses of all the paddles arranged in the diluting zone, and
   out of the plurality of paddles arranged around the rotational shaft, the clearance C2 is a smallest gap width between the outer circumferential surface of the paddle arranged in the diluting zone and the inner circumferential surface of the housing.

2. The twin-screw extruding kneader according to claim 1, further comprising:
   a resistance paddle arranged around each of the rotational shafts, which adjoins the paddle on a downstream side relative to the paddle in a conveying direction of the materials, wherein
   the resistance paddle includes a large part formed in a circular plate, which has such an external diameter that a first minute gap is formed between an outer circumferential surface of the large part and the inner circumferential surface of the housing, and a small part formed in a circular plate, which has an external diameter smaller than that of the large part, and
   the resistance paddle arranged around one of the rotational shafts, and the resistance paddle arranged around an opposite one of the rotational shafts face in opposite directions to coincide in position in the conveying direction of the materials so that a second minute gap is formed between the outer circumferential surface of the large part of the resistance paddle arranged around one of the rotational shafts and an outer circumferential surface of the small part of the resistance paddle arranged around the opposite one of the rotational shafts, and that a third minute gap is formed between the outer circumferential surface of the small part of the resistance paddle arranged around one of the rotational shafts and the outer circumferential surface of the large part of the resistance paddle arranged around the opposite one of the rotational shafts.

3. A method for producing an electrode mixture, comprising:
   conveying and kneading predetermined materials for the electrode mixture through the twin-screw extruding kneader according to claim 1 to produce a paste.

4. A method for producing an electrode mixture, comprising:
   conveying and kneading predetermined materials for the electrode mixture through the twin-screw extruding kneader according to claim 2 to produce a paste.

* * * * *